United States Patent
Anderson et al.

(10) Patent No.: US 12,124,728 B2
(45) Date of Patent: Oct. 22, 2024

(54) QUICK CLEARING OF REGISTERS

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Soujanya Narnur, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/353,181

(22) Filed: Jul. 17, 2023

(65) Prior Publication Data

US 2023/0359385 A1 Nov. 9, 2023

Related U.S. Application Data

(63) Continuation of application No. 17/722,477, filed on Apr. 18, 2022, now Pat. No. 11,704,046, which is a continuation of application No. 16/422,522, filed on May 24, 2019, now Pat. No. 11,307,791.

(51) Int. Cl.
| | | |
|---|---|---|
| G06F 3/06 | (2006.01) | |
| G06F 13/16 | (2006.01) | |
| G06F 15/80 | (2006.01) | |

(52) U.S. Cl.
CPC .......... *G06F 3/0652* (2013.01); *G06F 3/0604* (2013.01); *G06F 3/0673* (2013.01); *G06F 13/1668* (2013.01); *G06F 15/8076* (2013.01)

(58) Field of Classification Search
None
See application file for complete search history.

(56) References Cited

U.S. PATENT DOCUMENTS

| | | | |
|---|---|---|---|
| 3,108,256 A | 10/1963 | Buchholz et al. | |
| 4,559,618 A | 12/1985 | Houseman et al. | |
| 5,249,152 A * | 9/1993 | Malik | G11C 15/04 365/201 |
| 5,598,514 A | 1/1997 | Purcell et al. | |
| 5,606,662 A | 2/1997 | Wisor | |
| 5,663,952 A | 9/1997 | Gentry, Jr. | |
| 5,708,816 A | 1/1998 | Culbert | |
| 5,881,307 A | 3/1999 | Park et al. | |
| 6,389,468 B1 | 5/2002 | Muller et al. | |
| 6,981,232 B1 | 12/2005 | Lien et al. | |
| 7,162,559 B1 | 1/2007 | Kallat et al. | |
| 7,991,820 B1 * | 8/2011 | Sohay | G06F 7/505 708/700 |
| 10,073,699 B2 | 9/2018 | Eisen et al. | |
| 2002/0107943 A1 | 8/2002 | Heath et al. | |
| 2003/0014677 A1 | 1/2003 | Howard et al. | |
| 2007/0047281 A1 * | 3/2007 | Ramaraju | G11C 7/20 365/49.17 |
| 2007/0234433 A1 * | 10/2007 | Yeem | G06F 21/572 726/29 |

(Continued)

*Primary Examiner* — Eric Coleman
(74) *Attorney, Agent, or Firm* — Brian D. Graham; Frank D. Cimino

(57) ABSTRACT

A method of clearing of registers and logic designs with AND and OR logics to propagate the zero values provided to write enable signal buses upon the execution of clear instruction of more than one registers, allowing more than one architecturally visible registers to be cleared with one signal instruction regardless of the values of data buses.

20 Claims, 8 Drawing Sheets

(56) References Cited

U.S. PATENT DOCUMENTS

| | | | |
|---|---|---|---|
| 2008/0307275 A1* | 12/2008 | Wong | G06F 11/27 |
| | | | 714/719 |
| 2010/0153691 A1* | 6/2010 | Leijten | G06F 9/30076 |
| | | | 712/220 |
| 2011/0258615 A1 | 10/2011 | Sollich | |
| 2012/0144172 A1 | 6/2012 | de Cesare et al. | |
| 2013/0254517 A1* | 9/2013 | Jeong | G06F 9/30072 |
| | | | 712/223 |
| 2016/0092222 A1 | 3/2016 | Keppel et al. | |
| 2018/0032335 A1 | 2/2018 | Smith et al. | |
| 2018/0181344 A1 | 6/2018 | Tomishima et al. | |
| 2019/0121761 A1 | 4/2019 | Yuenyongsgool et al. | |

* cited by examiner

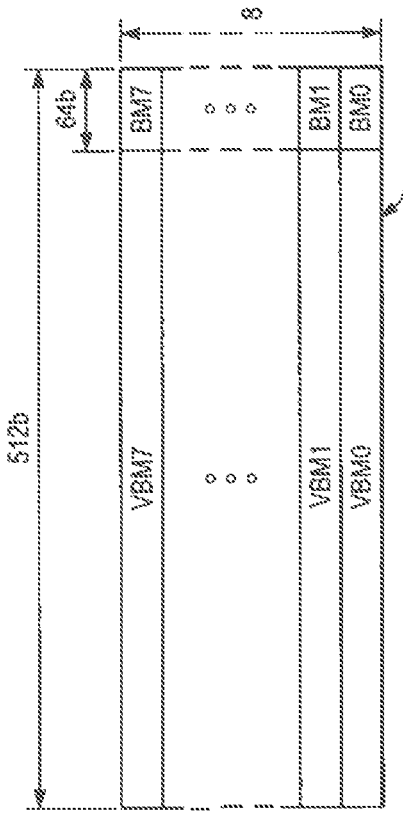
FIG. 10
FIG. 9
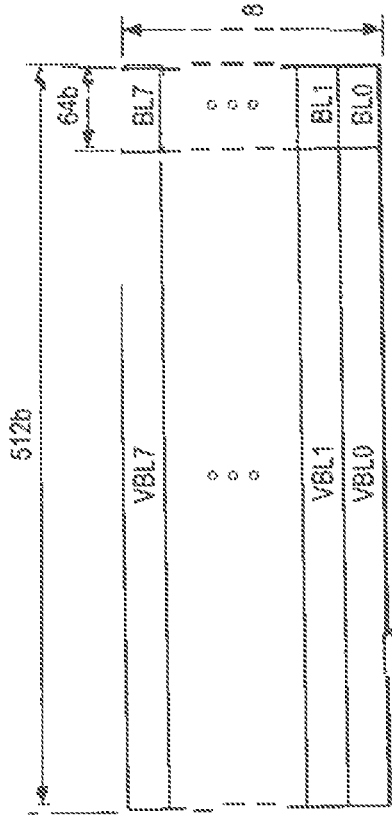
FIG. 12

QUICK CLEARING OF REGISTERS

CROSS-REFERENCE TO RELATED APPLICATIONS

This application is a continuation of U.S. patent application Ser. No. 17/722,477, filed Apr. 18, 2022, which is a continuation of U.S. patent application Ser. No. 16/422,522, filed May 24, 2019, now U.S. Pat. No. 11,307,791, each of which is incorporated by reference herein in its entirety.

TECHNICAL FIELD

This relates to the clearing of registers coupled to a digital signal processor.

BACKGROUND

Digital signal processors (DSP) are optimized for processing streams of data that may be derived from various input signals, such as sensor data, a video stream, a voice channel, radar signals, biomedical signals, etc. Digital signal processors operating on real-time data typically receive an input data stream, perform a filter function on the data stream (such as encoding or decoding) and output a transformed data stream. The system is called real-time because the application fails if the transformed data stream is not available for output when scheduled. A typical application requires memory access to load data registers in a data register file and then supply data from the data registers to functional units, which perform the data processing.

Register files include architecturally visible registers: registers visible to programmers. To clear the architecturally visible registers, currently multiple instructions each storing a zero value to each of the target registers must be executed.

SUMMARY

An aspect of the present disclosure provides a method and system of clearing of registers and logic designs with AND and OR logics to propagate the zero values provided to write enable signal buses upon the execution of a clear instruction of more than one registers, allowing more than one architecturally visible registers to be cleared with one signal instruction regardless of the values of data buses.

BRIEF DESCRIPTION OF THE DRAWINGS

For a detailed description of various examples, reference will now be made to the accompanying drawings in which:

FIG. 9 illustrates a local vector register file shared by arithmetic functional units.

FIG. 10 illustrates a local vector register file shared by the multiply and correlation functional units.

FIG. 12 illustrates sixteen instructions of a single fetch packet.

DETAILED DESCRIPTION

Figure 1:
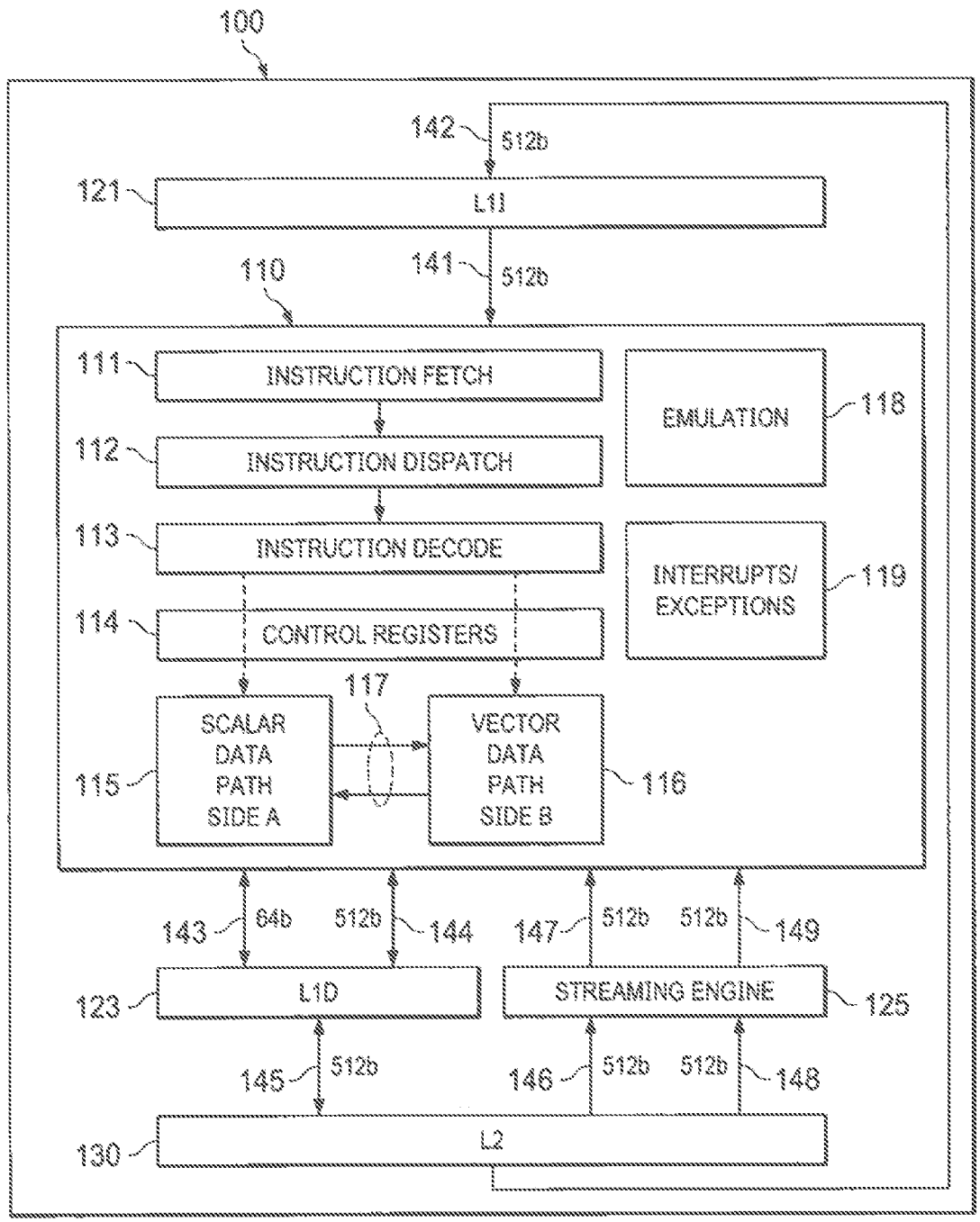
FIG. 1 illustrates an example of dual scalar/vector data path processor.

In the drawings, like elements are denoted by like reference numerals for consistency.

FIG. 1 illustrates an example processor 100 that includes dual scalar/vector data paths 115, 116. Processor 100 includes a streaming engine 125, level one instruction cache (L1I) 121 and level one data cache (L1D) 123. Processor 100 further includes a level two, combined instruction/data cache (L2) 130 that holds both instructions and data.

FIG. 1 illustrates a connection between L1I cache 121 and L2 combined instruction/data cache 130, 512-bit bus 142. FIG. 1 further illustrates a connection between L1D cache 123 and L2 combined instruction/data cache 130, 512-bit bus 145. In the example of processor 100, L2 combined instruction/data cache 130 stores both instructions to back up L1I cache 121 and data to back up L1D cache 123. In one example, L2 combined instruction/data cache 130 is further connected to higher level cache and/or memory using known or later developed memory system techniques not illustrated in FIG. 1.

The size of L1I cache 121, L1D cache 123, and L2 cache 130 may be implemented in different sizes in various examples; in this example, L1I cache 121 and L1D cache 123 are each 32 Kbytes, and L2 cache 130 is 1024 Kbytes. In one example, central processing unit core 110, L1I cache 121, L1D cache 123, and L2 combined instruction/data cache 130 are formed on a single integrated circuit. The singled integrated circuit may include other circuits.

Central processing unit core 110 fetches instructions from L1I cache 121 as controlled by instruction fetch unit 111. Instruction fetch unit 111 determines the next instructions to be executed and recalls a fetch packet sized set of such instructions. Instructions are directly fetched from L1I cache 121 upon a cache hit (if these instructions are stored in L1I cache 121). Upon a cache miss (the specified instruction fetch packet is not stored in L1I cache 121), these instructions are sought in L2 combined cache 130. In one example, the size of a cache line in L1I cache 121 equals the size of a fetch packet, which is 512 bits.

The memory locations of these instructions are either a hit in L2 combined cache 130 or a miss. A hit is serviced from L2 combined cache 130. A miss is serviced from a higher level of cache (not illustrated) or from main memory (not illustrated). In one example, the requested instruction is simultaneously supplied to both L1I cache 121 and central processing unit core 110 to speed use.

In FIG. 1, central processing unit core 110 includes multiple functional units to perform instruction specified data processing tasks. Instruction dispatch unit 112 determines the target functional unit of each fetched instruction. In one example, central processing unit 110 operates as a very long instruction world (VLIW) processor capable of operating on multiple instructions in corresponding functional units simultaneously. Preferably, a complier organizes instructions in execute packets that are executed together.

Instruction dispatch unit 112 directs each instruction to its target functional unit. The functional unit assigned to an instruction is completely specified by the instruction produced by a compiler. The hardware of central processing unit core 110 has no part in this functional unit assignment. In one example, instruction dispatch unit 112 may operate on several instructions in parallel. The number of such parallel instructions is set by the size of the execute packet.

One part of the dispatch task of instruction dispatch unit 112 is determining whether the instruction is to execute on a functional unit in scalar data path side A 115 or vector data path side B 116. An instruction bit within each instruction called the s bit determines which data path the instruction controls.

Instruction decode unit 113 decodes each instruction in a current execute packet. Decoding includes identification of the functional unit performing the instruction, identification of registers used to supply data for the corresponding data processing operation from among possible register files, and identification of the register destination of the results of the corresponding data processing operation. Instructions, from time to time, can include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar data path side A 115 and vector data path side B 116. This information, from time to time, can include mode information or the like.

The decoded instructions from instruction decode unit 113 and information stored in control registers 114 are supplied to scalar data path side A 115 and vector data path side B 116. As a result, functional units within scalar data path side A 115 and vector data path side B 116 perform instruction specified data processing operations upon instruction specified data and store the results in an instruction specified data register or registers. Each of scalar data path side A 115 and vector data path side B 116 include multiple functional units that operate in parallel. Data path 117 between scalar data path side A 115 and vector data path side B 116 permits data exchange.

Central processing unit core 110 includes further non-instruction-based modules. Emulation unit 118 permits determination of the machine state of central processing unit core 110 in response to instructions. The capability will typically be employed for algorithmic development. Interrupts/exceptions unit 119 enables central processing unit core 110 to be responsive to external, asynchronous events (interrupts) and to respond to attempts to perform improper operations (exceptions).

Processor 100 includes steaming engine 125. Streaming engine 125 supplies two data streams from predetermined addresses typically cached in L2 combined cache 130 to register files of vector data path side B of central processing unit core 110. This provides controlled data movement from memory (as cached in L2 combined cache 130) directly to functional unit operand inputs.

FIG. 1 further illustrates example data widths of busses between various parts. L1 I cache 121 supplies instructions to instruction fetch unit 111 via bus 141. In one example, bus 141 is a 512-bit bus. Bus 141 is unidirectional from L1I cache 121 to central processing unit 110. L2 combined cache 130 supplies instructions to L1I cache 121 via bus 142. In one example, bus 142 is a 512-bit bus. Bus 142 is unidirectional from L2 combined cache 130 to L1I cache 121.

L1D cache 123 exchanges data with register files in scalar data path side A 115 via bus 143. Bus 143 is a 64-bit bus in this example. L1D cache 123 exchanges data with register files in vector data path side B 116 via bus 144. Bus 144 is a 512-bit bus in this example. Busses 143 and 144 are illustrated as bidirectional supporting both central processing unit 110 data reads and data writes. L1D cache 123 exchanges data with L2 combined cache 130 via bus 145. Bus 145 is a 512-bit bus in this example. Bus 145 is illustrated as bidirectional supporting cache service for both central processing unit 110 data reads and data writes.

Processor data requests are directly fetched from L1D cache 123 upon a cache hit (if the requested data is stored in L1D cache 123). Upon a cache miss (the specified data is not stored in L1D cache 123), the data is sought in L2 combined cache 130. The memory locations of the requested data are either a hit in L2 combined cache 130 or a miss. A hit is serviced from L2 combined cache 130. A miss is serviced from another level of cache (not illustrated) or from main memory (not illustrated). The requested data may be simultaneously supplied to both L1D cache 123 and central processing unit 110 to speed use.

L2 combined cache 130 supplies data of a first data stream to streaming engine 125 via bus 146. Bus 146 is a 512-bit bus in this example. Streaming engine 125 supplies data of this first data stream to functional units of vector data path B via bus 147. Bus 147 is a 512-bit bus in this example. L2 combined cached 130 supplies data of a second data stream to streaming engine 125 via bus 148. Bus 148 is a 512-bit bus in this example. Streaming engine 125 supplies data of this second data stream to functional units of vector data path side B 116 via bus 149, which is a 512-bit bus in this example. Busses 146, 147, 148, and 149 are illustrated as unidirectional from L2 combined cache 130 to streaming engine 125 to vector data path side B 116 in accordance with this example.

Streaming engine data requests are directly fetched from L2 combined cache 130 upon a cache hit (if the requested data is stored in L2 combined cache 130). Upon a cache miss (the specified data is not stored in L2 combined cache 130), this data is sought from another level of cache (not illustrated) or from main memory (not illustrated). It is technically feasible in some examples for L1D cache 123 to cache data not stored in L2 combined cache 130. If such operation is supported, then upon a streaming engine data request that is a miss in L2 combined cache 130, L2 combined cache 130 should snoop L1D cache 123 for the data requested by the streaming engine 125. If L1D cache 123 stores this data, its snoop response would include the data, which is then supplied to service the streaming engine request. If L1D cache 123 does not store this data, its snoop response would indicate this and L2 combined cache 130 must service this streaming engine request from another level of cache (not illustrated) or from main memory (not illustrated).

Figure 2:
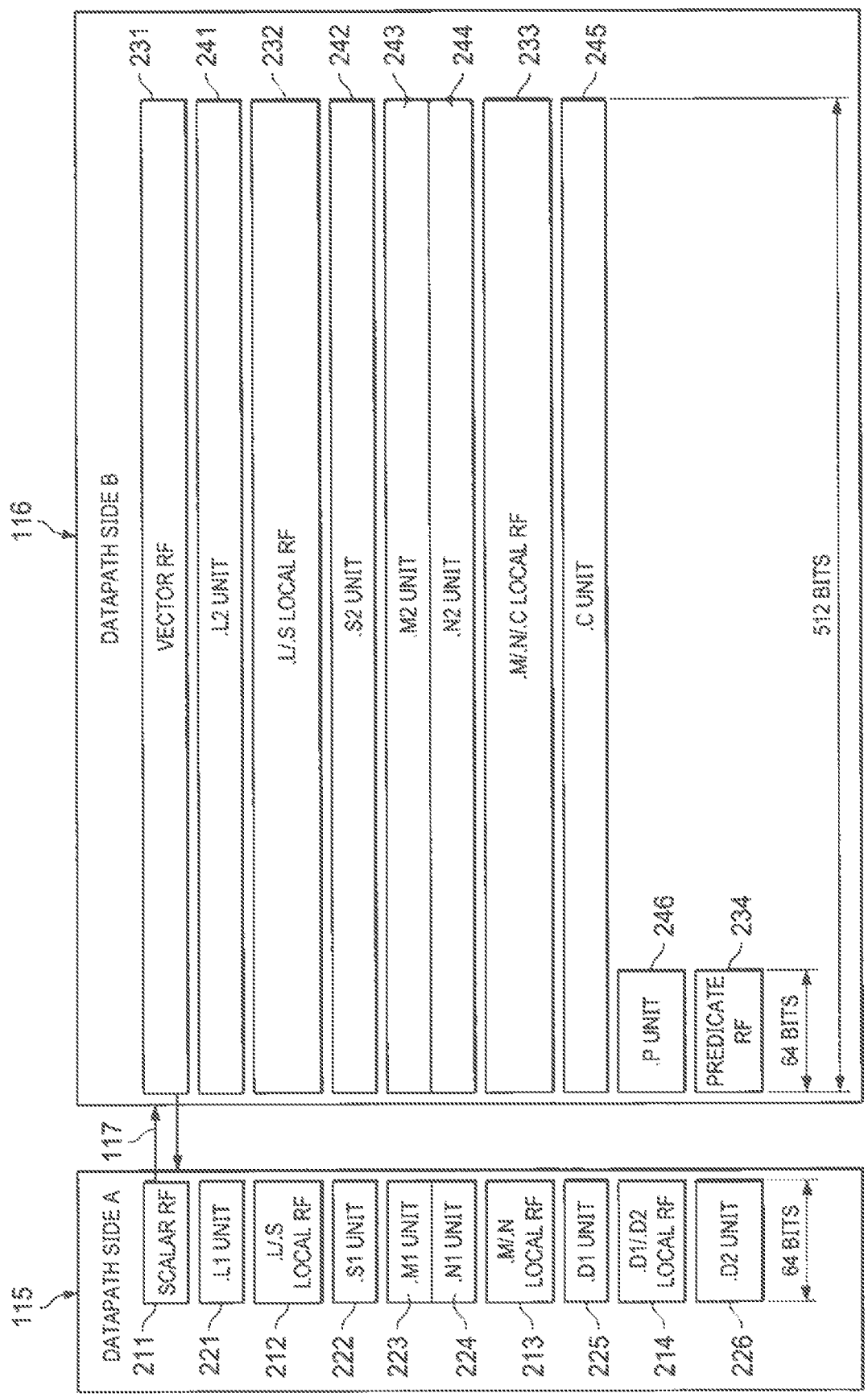
FIG. 2 illustrates the registers and functional units in the dual scalar/vector data path processors illustrated in FIG. 1.

FIG. 2 illustrates further details of functional units and register files within scalar data path side A 115 and vector data path side B 116. Scalar data path side A 115 includes L1 unit 221, S1 unit 222, M1 unit 223, N1 unit 224, D1 unit 225, and D2 unit 226. Scalar data path side A 115 includes global scalar register file 211, L1/S1 local register file 212, M1/N1 local register file 213, and D1/D2 local register file 214. Vector data path side B 116 includes L2 unit 241, S2 unit 242, M2 unit 243, N2 unit 244, C unit 245, and P unit 246. Vector data path side B 116 includes global vector register file 231, L2/S2 local register file 232, M2/N2/C local register file 233 and predicate register file 234. There are limitations upon which functional units may read from or write to which register files.

Scalar data path side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213, or D1/D2 local register file 214.

Scalar data path side A 115 includes S1 unit 222. S1 unit 222 generally accepts two 64-bit operands and produces one 64-bit result. The two operands are each recalled from an instruction specified register in either global scalar register file 211 or L1/S1 local register file 212. In one example, S1 unit 222 performs the same type of operations as L1 unit 221. In another example, there may be slight variations between the data processing operations supported by L1 unit 221 and S1 unit 222. The result may be written into an instruction specified register of global scalar register file 211, L1/S1 local register file 212, M1/N1 local register file 213, or D1/D2 local register file 214.

Scalar data path side A 115 includes M1 unit 223. M1 unit 223 generally accepts two 64-bit operands and produces one 64-bit result. The two operands are each recalled from an instruction specified register in either global scalar register file 211 or M1/N1 local register file 213. In this example, M1 unit 223 performs the following instruction selected operations: 8-bit multiply operations; complex dot product operations; 32-bit count operations; complex conjugate multiply operations; and bit-wise logical operations, moves, adds, and subtracts. The result may be written into an instruction specified register of global scalar register file 211, L1/S1 local register file 213, M1/N1 local register file 213, or D1/D2 local register file 214.

Scalar data path A 115 includes N1 unit 224. N1 unit 224 generally accepts two 64-bit operands and produces one 64-bit result. The two operands are each recalled from an instruction specified register in either global scalar register file 211 or M1/N1 local register file 213. In this example, N1 unit 224 performs the same type of operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213, or D1/D2 local register file 214.

Scalar data path side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. In this example, D1 unit 225 and D2 unit 226 also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213, or D1/D2 local register file 214.

Vector data path side B 116 includes L2 unit 241. L2 unit 241 generally accepts two 512-bit operands and produces one 512-bit result. The two operands are each recalled from an instruction specified register in either global vector register file 231, L2/S2 local register file 232, or predicate register file 234. In one example, L2 unit 241 performs instruction similar to L1 unit 221 except on wider 512-bit data. The result may be written into an instruction specified register of global vector register file 231, L2/S2 local register file 232, M2/N2/C local register file 233, or predicate register file 234.

Vector data path side B 116 includes S2 unit 242. S2 unit 242 generally accepts two 512-bit operands and produces one 512-bit result. The two operands are each recalled from an instruction specified register in either global vector register file 231, L2/S2 local register file 232, or predicate register file 234. In one example, S2 unit 242 performs instructions similar to S1 unit 222 except on wider 512-bit data. The result may be written into an instruction specified register of global vector register file 231, L2/S2 local register file 232, M2/N2/C local register file 233, or predicate register file 234.

Vector data path side B 116 includes M2 unit 243. M2 unit 243 generally accepts two 512-bit operands and produces one 512-bit result. The two operands are each recalled from an instruction specified register in either global vector register file 231 or M2/N2/C local register file 233. In one example, M2 unit 243 performs instructions similar to M1 unit 223 except on wider 512-bit data. The result may be written into an instruction specified register of global vector register file 231, L2/S2 local register file 232, or M2/N2/C local register file 233.

Vector data path side B 116 includes N2 unit 244. N2 unit 224 generally accepts two 512-bit operands and produces one 512-bit result. The two operands are each recalled from an instruction specified register in either global vector register file 231 or M2/N2/C local register file 233. In one example, N2 unit 244 performs the same type of operations as M2 unit 243. There may be certain double operations (called dual issued instructions) that employ both M2 unit 243 and the N2 unit 244 together. The result may be written into an instruction specified register of global vector register file 231, L2/S2 local register file 232, or M2/N2/C local register file 233.

Vector data path side B 116 includes correlation (C) unit 245. C unit 245 generally accepts two 512-bit operands and produces one 512-bit result. The two operands are each recalled from an instruction specified register in either global vector register file 231 or M2/N2/C local register file 233. In one example, C unit 245 performs: "Rake" and "search" instructions that are used for WCDMA (wideband code division multiple access) encoding/decoding. In one example, C unit 245 can perform up to 512 multiplies per clock cycle of a 2-bit PN (pseudorandom number) and 8-bit I/Q (complex number); 8-bit and 16-bit Sum-of-Absolute-Difference (SAD) calculations, up to 512 SADs per clock cycle; horizontal add and horizontal min/max instructions; and vector permutes instructions.

C unit 245 also contains 4 vector control registers (CUCR0 to CUCR3) used to control certain operations of C unit 245 instructions. Control registers CUCR0 to CUCR3 are used as operands in certain C unit 245 operations. In one example, control registers CUCR0 to CUCR3 are used: in control of a general permutation instruction (VPERM); and as masks for SIMD multiple DOT product operations (DOPTM), and SIMD multiple SAD operations. In other examples, control register CUCR0 is used to store the polynomials for Galois Field Multiply operations (GFMPY), and control register CUCR1 is used to store a Galois Field polynomial generator function.

Vector data path side B 116 includes P unit 246. Vector predicate (P) unit 246 performs basic logic operations on registers of local predicate register file 234. P unit 246 has direct access to read from and write to predication register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND (a bitwise AND of data of the two registers); NAND (a bitwise AND and negate of data of the two registers); OR (a bitwise OR of data of the two registers); NOR (a bitwise OR and negate of data of the two registers); and XOR (exclusive OR of data of the two registers).

These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Figure 3:
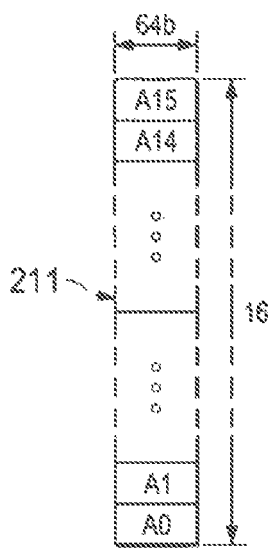
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64 bits of scalar data. All scalar data path side A 115 functional units (L1 unit 221, S1 unit 222, M1 unit 223, N1 unit 224, D1 unit 225, and D2 unit 226) can read from or write to global scalar register file 211. Global scalar register file 211 may be read from as 32 bits or as 64 bits and may only be written to as 64 bits in this example. The instruction executing determines the read data size. Vector data path side B 116 functional units (L2 unit 241, S2 unit 242, M2 unit 243, N2 unit 244, C unit 245, and P unit 246) can read from global scalar register file 211 via cross path 117 under restrictions that will be detailed below.

Figure 4:
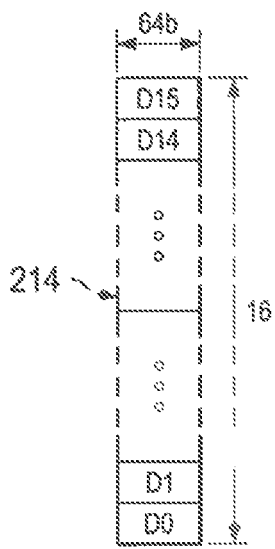
FIG. 4 illustrates a local scalar register file shared by arithmetic functional units.

FIG. 4 illustrates D1/D2 local register file 214. There are sixteen independent 64-bit wide scalar registers designated D0 to D15. Each register of D1/D2 local register file 214 can be read from or written to as 64 bits of scalar data. All scalar data path side A 115 functional units (L1 unit 221, S1 unit 222, M1 unit 223, N1 unit 224, D1 unit 225, and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
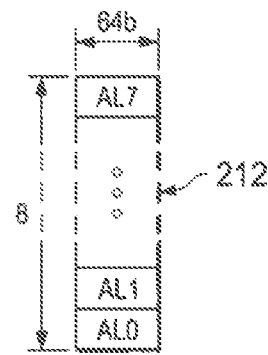
FIG. 5 illustrates a local scalar register file shared by multiply functional units.

FIG. 5 illustrates L1/S1 local register file 212. In this example, L1/S1 local register file 212 includes eight independent 64-bit wide scalar registers designated AL0 to AL7. In this example, the instruction coding permits L1/S1 local register file 212 to include up to 16 registers, but only eight registers are implemented to reduce circuit size and complexity. Each register of L1/S1 local register file 212 can be read from or written to as 64 bits of scalar data. All scalar data path side A 115 functional units (L1 unit 221, S1 unit 222, M1 unit 223, N1 unit 224, D1 unit 225, and D2 unit 226) can write to L1/S1 local scalar register file 212. Only L1 unit 221 and S1 unit 222 can read from L1/S1 local scalar register file 212.

Figure 6:
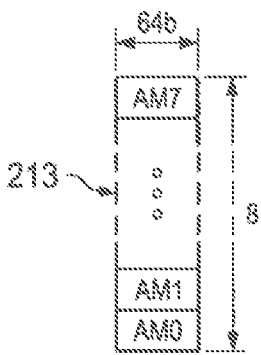
FIG. 6 illustrates a local scalar register file shared by load/store units.

FIG. 6 illustrates M1/N1 local register file 213. In this example, eight independent 64-bit wide scalar registers designated AM0 to AM7 are implemented. In this example, the instruction coding permits M1/N1 local register file 213 to include up to 16 registers, but only eight registers are implemented to reduce circuit size and complexity. Each register of M1/N1 local register file 213 can be read from or written to as 64 bits of scalar data. All scalar data path side A 115 functional units (L1 unit 221, S1 unit 222, M1 unit 223, N1 unit 224, D1 unit 225, and D2 unit 226) can write to M1/N1 local scalar register file 213. Only M1 unit 223 and N1 unit 224 can read from M1/N1 local scalar register file 213.

Figure 7:
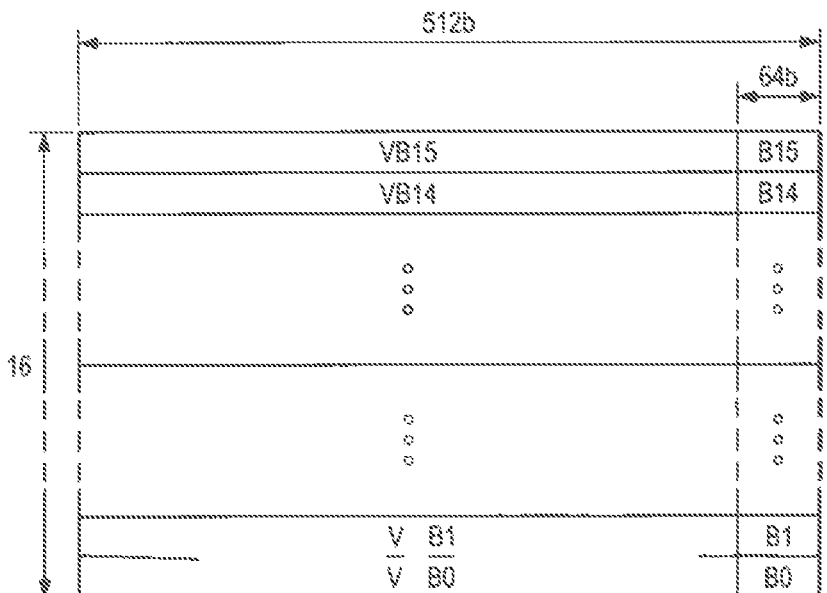
FIG. 7 illustrates a global vector register file.

FIG. 7 illustrates global vector register file 231. There are sixteen independent 512-bit wide vector registers. Each register of global vector register file 231 can be read from or written to as 64 bits of scalar data designated B0 to B15. Each register of global vector register file 231 can be read from or written to as 512 bits of vector data designated VB0 to VB15. The instruction type determines the data size. All vector data path side B 116 functional units (L2 unit 241, S2 unit 242, M2 unit 243, N2 unit 244, C unit 245, and P unit 246) can read from or write to global vector register file 231. Scalar data path side A 115 functional units (L1 unit 221, S1 unit 222, M1 unit 223, N1 unit 224, D1 unit 225, and D2 unit 226) can read from global vector register file 231 via cross path 117 under restrictions that will be detailed below.

Figure 8:
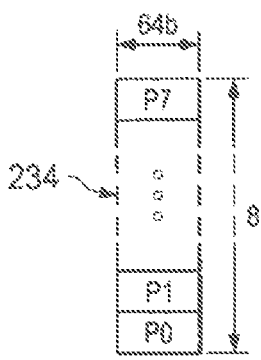
FIG. 8 illustrates a predicate register file.

FIG. 8 illustrates predicate (P) local register file 234. There are eight independent 64-bit wide registers designated P0 to P7. Each register of P local register file 234 can be read from or written to as 64 bits of scalar data. Vector data path side B 116 functional units L2 unit 241, S2 unit 242, C unit 244 and P unit 246 can write to P local register file 234. Only L2 unit 241, S2 unit 242, and P unit 246 can read from P local scalar register file 234. A commonly expected use of P local register file 234 includes: writing one-bit SIMD vector comparison results from L2 unit 241, S2 unit 242, or C unit 244; manipulation of the SIMD vector comparison results by P unit 246; and use of the manipulated results in control of a further SIMD vector operation.

FIG. 9 illustrates L2/S2 local register file 232. In this example, eight independent 512-bit wide vector registers are implemented. In this example, the instruction coding permits L2/S2 local register file 232 to include up to sixteen registers, but only eight registers are implemented to reduce circuit size and complexity. Each register of L2/S2 local vector register file 232 can be read from or written to as 64 bits of scalar data designated BL0 to BL7. Each register of L2/S2 local vector register file 232 can be read from or written to as 512 bits of vector data designated VBL0 to VBL7. The instruction type determines the data size. All vector data path side B 116 functional units (L2 unit 241, S2 unit 242, M2 unit 243, N2 unit 244, C unit 245, and P unit 246) can write to L2/S2 local vector register file 232. Only L2 unit 241 and S2 unit 242 can read from L2/S2 local vector register file 232.

FIG. 10 illustrates M2/N2/C local register file 233. In this example, eight independent 512-bit wide vector registers are implemented. In this example, the instruction coding permits M2/N2/C local register file 233 to include up to sixteen registers, but only eight registers are implemented to reduce circuit size and complexity. Each register of M2/N2/C local vector register file 233 can be read from or written to as 64 bits of scalar data designated BM0 to BM7. Each register of M2/N2/C local vector register file 233 can be read from or written to as 512 bits of vector data designated VBM0 to VBM7. All vector data path side B 116 functional units (L2 unit 241, S2 unit 242, M2 unit 243, N2 unit 244, C unit 245, and P unit 246) can write to M2/N2/C local vector register file 233. Only M2 unit 243, N2 unit 244, and C unit 245 can read from M2/N2/C local vector register file 233.

The provision of global register files accessible by all functional units of a side and local register files accessible by only some of the functional units of a side is a design choice. In another example, a different accessibility provision could be made, such as employing only one type of register file corresponding to the global register files described herein.

Cross path 117 permits limited exchange of data between scalar data path side A 115 and vector data path side B 116. During each operational cycle one 64-bit data word can be recalled from global scalar register file A 211 for use as an operand by one or more functional units of vector data path side B 116 and one 64-bit data word can be recalled from global vector register file 231 for use as an operand by one or more functional units of scalar data path side A 115. Any scalar data path side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231.

Multiple scalar data path side A 115 functional units may employ the same 64-bit cross path data as an operand during the same operational cycle. However, in this example, only one 64-bit operand is transferred from vector data path side B 116 to scalar data path side A 115 in any single operational cycle. Any vector data path side B 116 functional unit (L2 unit 241, S2 unit 242, M2 unit 243, N2 unit 244, C unit 245, and P unit 246) may read a 64-bit operand from global scalar register file 211. If the corresponding instruction is a scalar instruction, the cross-path operand data is treated as any other 64-bit operand. If the corresponding instruction is a vector instruction, the upper 448 bits of the operand are zero filled. Multiple vector data path side B 116 functional units may employ the same 64-bit cross path data as an operand during the same operational cycle. In one example, only one 64-bit operand is transferred from scalar data path side A 115 to vector data path side B 116 in any single operational cycle.

Figure 11:
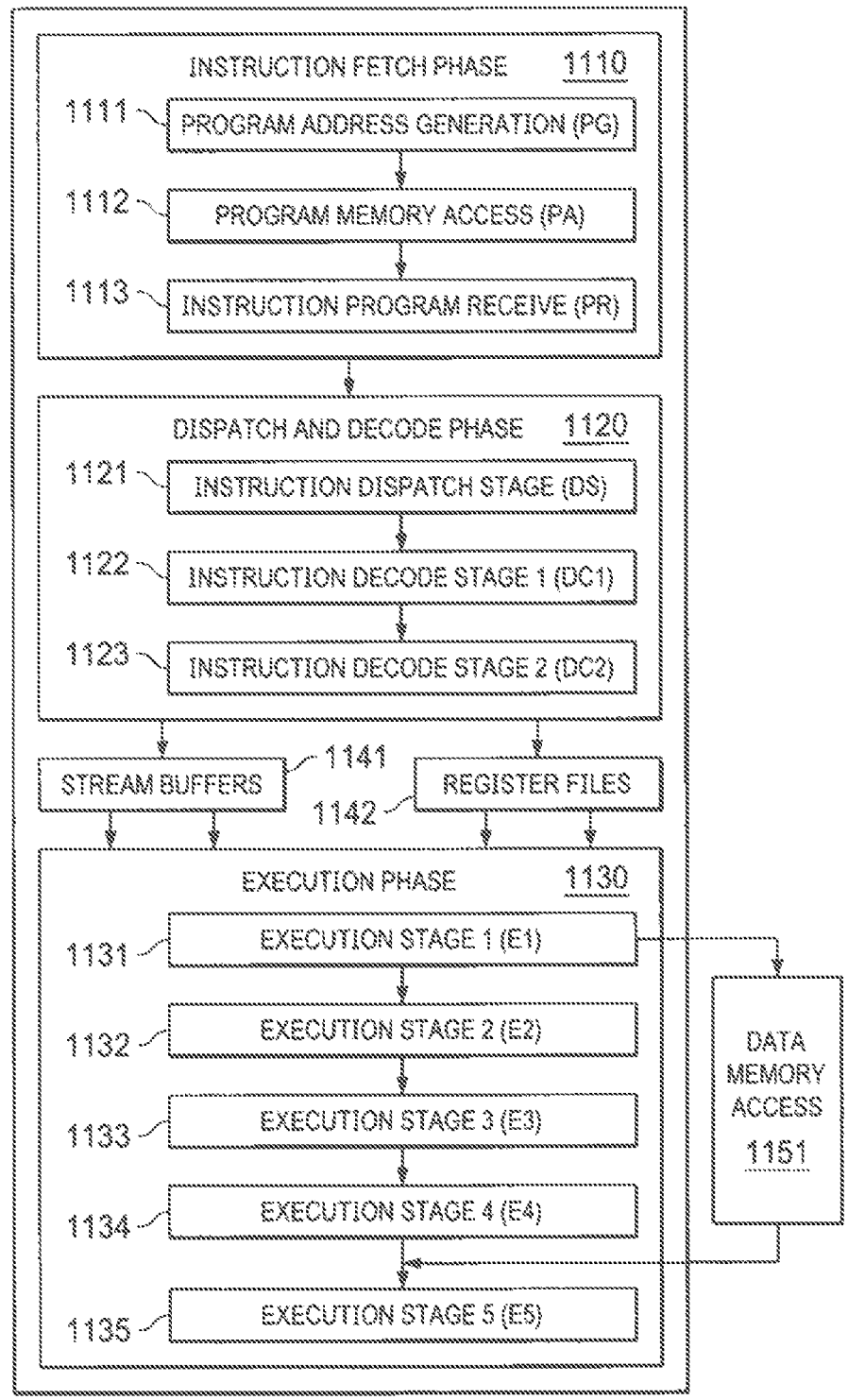
FIG. 11 illustrates pipeline phases of a central processing unit of this example.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation (PG) stage 1111, program access (PA) stage 1112, and program receive (PR) stage 1113. During program address generation stage 1111, the program address is generated in the processor and the read request is sent to the memory controller for the L1I cache. During the program access stage 1112, the L1I cache processes the request, accesses the data in its memory, and sends a fetch packet to the processor boundary. During the program receive stage 1113, the processor registers the fetch packet.

Instructions are fetched in a fetch packet that includes sixteen 32-bit wide words. FIG. 12 illustrates sixteen instructions 1201 to 1216 of a single fetch packet. Fetch packets are aligned on 512-bit (16-word) boundaries. This example employs a fixed 32-bit instruction length. Fixed length instructions are advantageous for several reasons. Fixed length instructions enable easy decoder alignment. A properly aligned instruction fetch can load multiple instructions into parallel instruction decoders. Such a properly aligned instruction fetch can be achieved by predetermined instruction alignment when stored in memory by having fetch packets aligned on 512-bit boundaries coupled with a fixed instruction packet fetch. Conversely, variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. In this example, the p bit is bit 0 of the 32-bit wide slot. The p bit determines whether an instruction executes in parallel with a next instruction. In this example, instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

Processor core 110 (FIG. 1) and L1I cache 121 pipelines (FIG. 1) are de-coupled from each other. Fetch packet returns from L1I cache can take a different number of clock cycles, depending on external circumstances such as whether there is a hit in L1I cache 121 or a hit in L2 combined cache 130. Therefore, program access stage 1112 can take several clock cycles instead of one clock cycle as in the other stages.

The instructions executing in parallel constitute an execute packet. In this example, an execute packet can contain up to sixteen 32-bit wide slots for sixteen instructions. No two instructions in an execute packet may use the same functional unit. A slot is one of five types: 1) a self-contained instruction executed on one of the functional units of processor core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245, and P unit 246); 2) a unitless instruction such as a NOP (no operation) instruction or multiple NOP instructions; 3) a branch instruction; 4) a constant field extension; and 5) a conditional code extension.

Dispatch and decode phases 1120 (FIG. 11) include instruction dispatch to appropriate execution unit (DS) stage 1121, instruction pre-decode (DC1) stage 1122, and instruction decode, operand read (DC2) stage 1123. During instruction dispatch to appropriate execution unit stage 1121, the fetch packets are split into execute packets and assigned to the appropriate functional units. During the instruction pre-decode stage 1122, the source registers, destination registers and associated paths are decoded for the execution of the instructions in the functional units. During the instruction decode, operand reads stage 1123, more detailed unit decodes are done, as well as reading operands from the register files.

Execution phase 1130 includes execution (E1 to E5) stages 1131 to 1135. Different types of instructions require different numbers of these stages to complete their execution. These stages of the pipeline play an important role in understanding the device state at processor cycle boundaries.

During E1 stage 1131, the conditions for the instructions are evaluated and operands are operated on. As illustrated in FIG. 11, E1 stage 1131 may receive operands from a stream buffer 1141 and one of the register files shown schematically as 1142. For load and store instructions, address generation is performed, and address modifications are written to a register file. For branch instructions, branch fetch packet in the PG phase (1111) is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after E1 stage 1131.

During E2 stage 1132, load instructions send the address to memory. Store instructions send the address and data to memory. Single-cycle instructions that saturate results set the SAT bit in the control status register (CSR) if saturation occurs. For 2-cycle instructions, results are written to a destination register file.

During E3 stage 1133, data memory accesses are performed. Any multiply instructions that saturate results set the SAT bit in the CSR if saturation occurs. For 3-cycle instructions, results are written to a destination register file.

During E4 stage 1134, load instructions bring data to the processor boundary. For 4-cycle instructions, results are written to a destination register file.

During E5 stage 1135, load instructions write data into a register. This is illustrated schematically in FIG. 11 with input from memory 1151 to E5 stage 1135.

Figure 13:
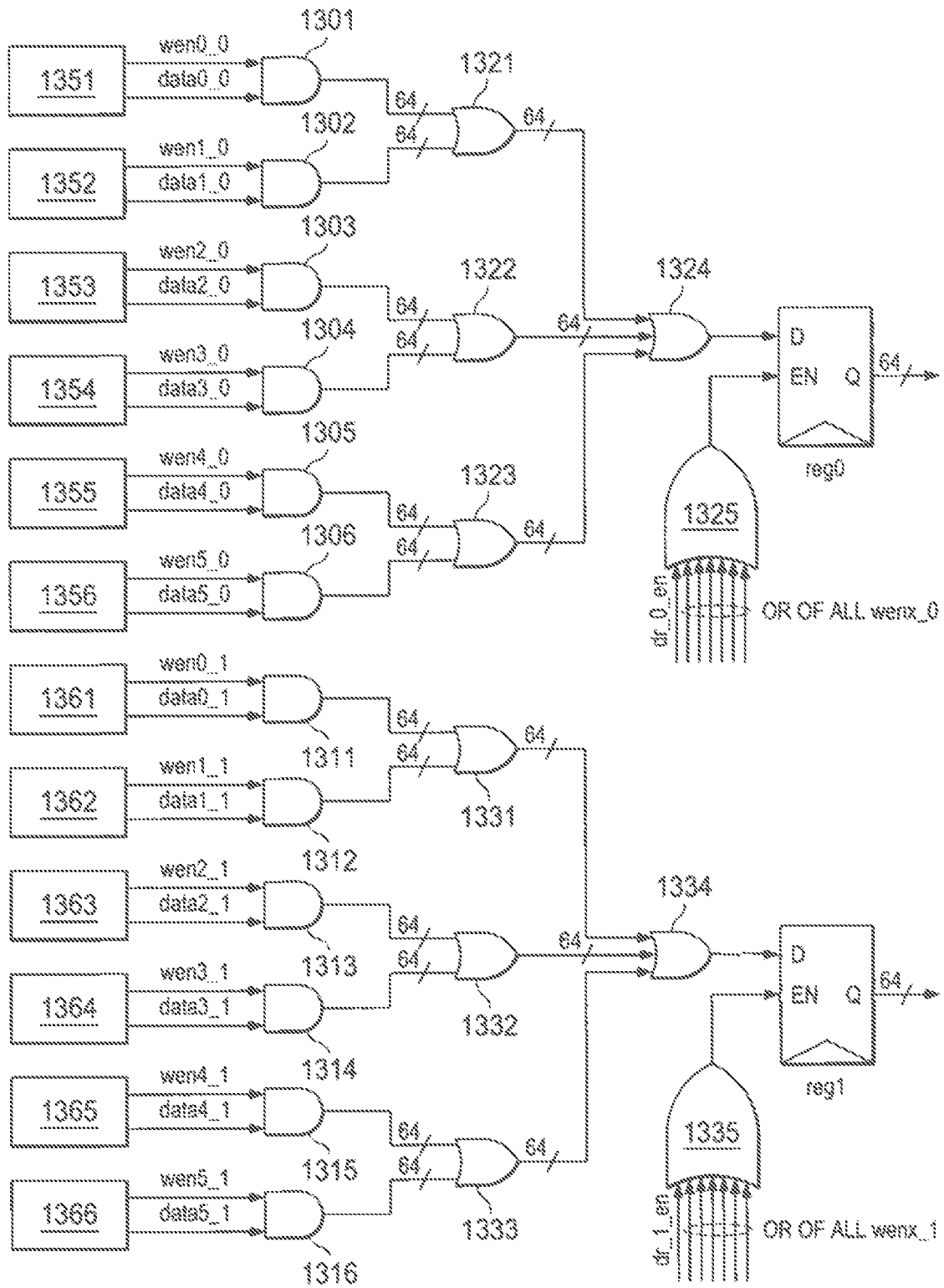
FIG. 13 illustrates a logic design of a mux providing a clear instruction to an architecturally visible register in accordance with an example of this disclosure.

FIG. 13 illustrates a logic design of a mux providing clear instructions to architecturally visible registers according to an example of this disclosure. In the example of FIG. 13, the mux is implemented within a processing system including a processor with at least two architecturally visible registers reg0, reg1, functional units 1351~4356, 1361~4366, multiple AND logics, 1301~4306, 1311~4316, multiple OR logics 1321~4325, 1331~4335, multiple write enable signal buses wen0_0~wen5_0, wen0_1~wen5_1, and multiple data buses data0_0~data5_0, data0_1~data5_1.

Figure 14:
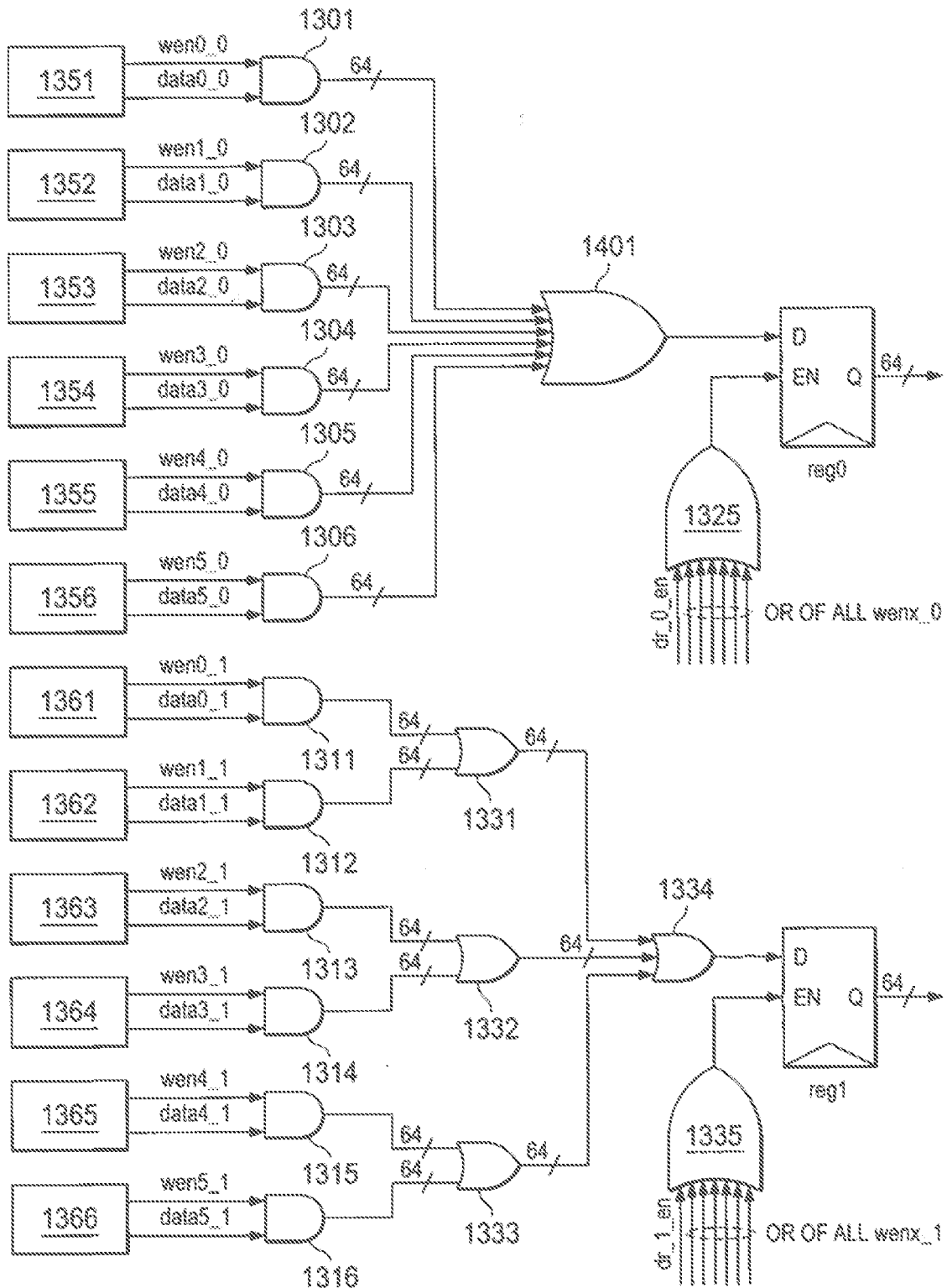
FIG. 14 illustrates a logic design of a mux providing a clear instruction to an architecturally visible register in accordance with yet another example of this disclosure.

In the example of FIG. 13, logics may be implemented using software or hardware, such as circuits or gates. The number of architecturally visible registers, functional units, logics, and buses of FIG. 13 is exemplary, and is not limiting. Various architectures with different number of architecturally visible registers, functional units, logics, and buses, such as architectures illustrated in FIGS. 14 and 15 below, may be implemented according to an aspect of the present disclosure.

Each of the functional units 1351~1356 is coupled to a respective one of the write enable signal buses wen0_0 wen5_0, and a respective one of the data buses data0_0 data5_0. Each of the data buses data0_0 data5_0 corresponds to a respective one of the write enable signal buses wen0_0 wen5_0. Where a write signal is provided to one of the write enable signal buses wen0_0 wen5_0, the value of the corresponding data bus data0_0~data 5_0 is provided to the respective location of the register reg0 to be written. Similarly, each of the functional units 1361~1366 is coupled to a respective one of the write enable signal buses wen0_1 wen5_1, and a respective one of the data buses data0_1 data5_1. Each of the data buses data0_1 data5_1 corresponds to a respective one of the write enable signal buses wen0_1 wen5_1. Where a write signal is provided to one of the write enable signal buses wen0_1 wen5_1, the value of the corresponding data bus data0_1 data 5_1 is provided to the respective location of the register reg1 to be written.

Each pair of write enable signal bus and its corresponding data bus is coupled to a respective one of AND logics 1301~1306, 1311~1316. The outputs of AND logics 1301~1306 are further provided to multiple OR logics 1321~1323, and the output of OR logics 1321~1323 are then provided to OR logic 1324. Similarly, the outputs of AND logics 1311~1316 are further provided to multiple OR logics 1331~1333, and the output of OR logics 13311333 are then provided to OR logic 1334. Each of the final outputs of OR logics 1324, 1334 is respectively provided to the corresponding registers reg0, reg1 and written thereto where a write clock is provided to the respective registers reg0, reg1 via OR logics 1325, 1335.

In the example of FIG. 13, registers reg0, reg1 are registers of global scalar register files 211 of FIG. 2 and FIG. 3. A0 of FIG. 3 corresponds to reg0, and A1 of FIG. 3 corresponds to reg1. In yet another embodiment, registers reg0, reg1 may be any type of scalar or vector register files that are architecturally visible, e.g., L1/S1 local register file 212, M1/N1 local register file 213, D1/D2 local register file 214, global vector register file 231, L2/S2 local register file 232, or M2/N2/C local register file 233 of FIG. 2.

At a given time, only one of the functional units 1351~1356 coupled to register reg0 is permitted to write on register reg0. For example, where functional unit 1351 is permitted to write on register reg0, other functional units 1352~4356 are not permitted to write on register reg0 at the same time. Accordingly, where functional unit 1351 provides a write instruction signal to write enable signal bus wen0_0, no write instruction signal is provided to other write enable signal buses wen1_0~wen5_0 coupled to register reg0. When the write instruction signal is provided to write enable signal bus wen0_0, data provided to its corresponding data bus0_0 by functional unit 1351 is provided to AND logic 1301, and subsequently provided to OR logic 1321 and OR logic 1324 to be written on register reg0. In the present example, 64~bit word is written to register reg0 per single write instruction. Similarly, at a given time, only one of the function units 1361~1366 coupled to register reg1 is permitted to write on register reg1. Where an instruction to clear more than one of the architecturally visible registers reg0, reg1 is executed, all functional units 1351~1356 and functional units 1361~4366, provide zero values to their coupled write enable signal buses wen0_0 wen5_0, wen0_1~wen5_1. Based on the zero values of the write enable signal buses wen0_0 wen5_0, wen0_1~wen5_1, the multiple AND logics 1301~1306, 1311~1316 all output value zero regardless of the values of data buses data0_0~data 5_0, data0_1~data5_1. The zero value output of the multiple AND logics 1301~1306, 1311~1316, are then evaluated by the multiple OR logics 1321~1324, 1331~1334, as described above, and provided to the respective registers reg0, reg1 upon a clock signal from the respective OR logics 1325, 1335. This results in a zero value being written to each of registers reg0, reg1.

According to the example of FIG. 13, by merely providing zero values to the write enable signal buses, all the registers (reg0, reg1 in this example, as well as any other register coupled to write enable signal buses) are cleared regardless of the values on the corresponding data buses. This reduces the instructions required to clear values in multiple registers.

In another example, a clear instruction may include a list of registers to clear amongst the multiple architecturally visible registers. Where the clear instruction includes a list of registers to clear, the addresses of the registers of the list is decoded. Functional units corresponding to the registers of the decoded addresses provide a zero value to the write enable signal buses coupled to the registers of the decoded addresses.

For example, in the architecture of FIG. 13, a clear instruction may indicate that register reg0 should be cleared but not register reg1. The clear instruction including the register reg0 address information is decoded by an instruction decoder (not shown). The instruction decoder, in turn, provides the clear instruction to functional units 1351-1356 coupled to register reg0. Each of the functional units 1351-1356 coupled to register reg0 provides a zero value to a respective one of the write enable signal buses wen0_0~wen5_0. The zero value of the write enable signal buses wen0_0 wen5_0 are propagated to the respective register reg0 of the decoded address so that the register reg0 is cleared upon a write enable clock signal.

In yet another embodiment, different number of OR logics may be employed in lieu of OR logics of FIG. 13. For example, in FIG. 14, OR logics 1321, 1322, 1323, and 1324 of FIG. 13 may be replaced with a single OR logic 1401 with multiple inputs to accommodate outputs provided by AND logics 1301-4306. In this embodiment, where a clear instruction is provided to the functional units 1351-4356, the zero value outputs of the respective AND logics 1301-1306 are provided to OR logic 1401 and subsequently provided to register reg0 to clear the register upon a write enable clock signal.

Figure 15:
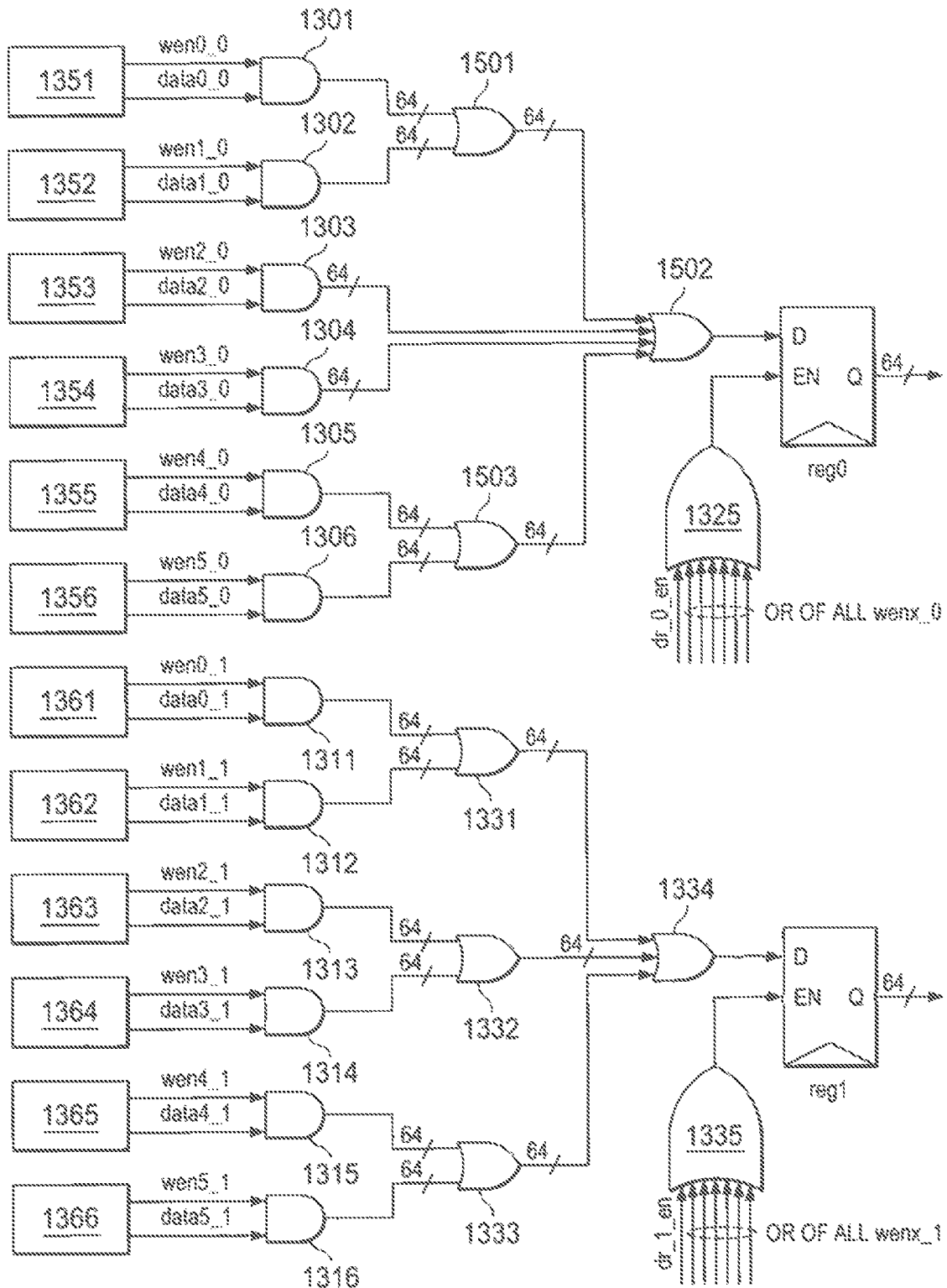
FIG. 15 illustrates a logic design of a mux providing a clear instruction to an architecturally visible register in accordance with yet another example of this disclosure.

In another example, in FIG. 15, outputs of AND logics 1301, 1302 are provided to OR logic 1501, outputs of AND logics 1303, 1304 are provided to OR logic 1502, and outputs of AND logics 1305, 1306 are provided to OR logic 1503. The outputs of OR logic 1501 and OR logic 1503 are further provided to OR logic 1502 as additional inputs. In this embodiment, where a clear instruction is provided to functional units 1351-1356, the zero value outputs of AND logics 1301, 1302 are provided to OR logic 1501, the zero value outputs of AND logics 1303, 1304 are provided to OR logic 1502, and the zero value outputs of AND logics 1305, 1306 are provided to OR logic 1503. Subsequently, the zero value outputs of OR logic 1501 and OR logic 1503 are provided to OR logic 1502 as additional inputs. OR logic 1502 output, based on the zero value inputs, is provided to register reg0 to clear the register reg1 upon a write enable clock signal.

The implementation of the OR logic design may depend on various factors, e.g., timing requirement to process an instruction, compatibility with other micro-architecture, etc. In another example, the clear instruction of FIGS. 14 and 15 may include a list of registers to clear amongst the multiple architecturally visible registers. For example, where the clear instruction does not include a list of register addresses, all functional units coupled to architecturally visible registers, e.g., reg0, reg1, provide zero values to its respective one of write enable signal buses. Where the clear instruction includes a list of register addresses, only functional units coupled to the architecturally visible registers corresponding to the list of addresses provide zero values to its respective one of write enable signal buses.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described examples, and other examples are possible, within the scope of the claims.

What is claimed is:

1. A device comprising:
a set of functional units that each include a data output and a write enable output;
a set of AND circuits that each include:
a first input coupled to the data output of a respective functional unit of the set of functional units; and
a second input coupled to the write enable output of the respective functional unit of the set of functional units;
an output;
a set of OR circuits that includes:
a set of inputs that are each coupled to the output of a respective AND circuit of the set of AND circuits; and
an output; and
a register that includes a data input coupled to the output of the set of OR circuits.

2. The device of claim 1, wherein each functional unit of the set of functional units is configured to, in response to a register clear instruction, provide a respective write enable signal at the respective write enable output that disables writing of a value at the respective data output.

3. The device of claim 2, wherein:
the register is a first register;
the device further comprises a second register; and
the register clear instruction specifies to perform a clear operation on the first register and specifies whether to perform a clear operation on the second register.

4. The device of claim 3, wherein:
the set of functional units is a first set of functional units;
the device further comprises a second set of functional units that each include a data output and a write enable output; and
each functional unit of the second set of functional units is configured to, in response to the register clear instruction specifying to perform the clear operation on the second register, provide a respective write enable signal at the respective write enable output that disables writing of a value at the respective data output.

5. The device of claim 2, wherein:
the register includes an enable input;
the device further comprises an enable circuit coupled to the enable input of the register; and
the enable circuit is configured to, in response to the register clear instruction, assert an enable signal at the enable input of the register.

6. The device of claim 5, wherein the enable signal is a write clock signal.

7. The device of claim 2, wherein the respective write enable signal of the set of functional units that disables writing of the value at the respective data output corresponds to a zero value.

8. The device of claim 2, wherein the register clear instruction specifies a list of registers to clear that includes the register.

9. The device of claim 1, wherein the set of OR circuits includes:
- a first subset of OR circuits that each include:
  - a first input coupled to the output of a first respective AND circuit of the set of AND circuits;
  - a second input coupled to the output of a second respective AND circuit of the set of AND circuits; and
  - an output; and
- a second subset of OR circuits that each include:
  - a first input coupled to the output of a first respective OR circuit of the first subset of OR circuits; and
  - a second input coupled to the output of a second respective OR circuit of the first subset of OR circuits.

10. The device of claim 1, wherein the register is an architecturally visible register.

11. The device of claim 1 further comprising a register file that includes the register.

12. A device comprising:
- a first set of functional units that each include a data output and a write enable output;
- a second set of functional units that each include a data output and a write enable output;
- a first set of AND circuits that each include:
  - a first input coupled to the data output of a respective functional unit of the first set of functional units; and
  - a second input coupled to the write enable output of the respective functional unit of the first set of functional units;
  - an output;
- a first set of OR circuits that includes:
  - a set of inputs that are each coupled to the output of a respective AND circuit of the first set of AND circuits; and
  - an output;
- a second set of AND circuits that each include:
  - a first input coupled to the data output of a respective functional unit of the second set of functional units; and
  - a second input coupled to the write enable output of a respective functional unit of the second set of functional units;
  - an output;
- a second set of OR circuits that includes:
  - a set of inputs that are each coupled to the output of a respective AND circuit of the second set of AND circuits; and
  - an output;
- a first register that includes a data input coupled to the output of the first set of OR circuits; and
- a second register that includes a data input coupled to the output of the second set of OR circuits.

13. The device of claim 12, wherein:
the first set of functional units is not coupled to the second register; and
the second set of functional units is not coupled to the first register.

14. The device of claim 12, wherein:
each functional unit of the first set of functional units is configured to, in response to a register clear instruction that specifies a list of registers that includes the first register, provide a respective write enable signal at the respective write enable output that disables writing of a value at the respective data output; and
each functional unit of the second set of functional units is configured to, in response to the list of registers including the second register, provide a respective write enable signal at the respective write enable output that disables writing of a value at the respective data output.

15. The device of claim 14, wherein:
the first register includes an enable input;
the second register includes an enable input;
the device further comprises:
- a first enable circuit coupled to the enable input of the first register; and
- a second enable circuit coupled to the enable input of the second register; and
the enable circuit is configured to, in response to the register clear instruction, assert a first enable signal at the enable input of the first register and a second enable signal at the enable input of the second register.

16. The device of claim 15, wherein the first and second enable signals are write clock signals.

17. The device of claim 14, wherein the respective write enable signal that disables writing of the value at the respective data output corresponds to a zero value.

18. The device of claim 14, wherein the register clear instruction specifies a list of registers to clear that includes the first and second registers.

19. The device of claim 12, wherein the first and second registers are architecturally visible registers.

20. The device of claim 12 further comprising a register file that includes the first and second registers.

* * * * *